L. A. SHERTZER.
NUT LOCK.
APPLICATION FILED MAY 9, 1921.
1,388,610.
Patented Aug. 23, 1921.
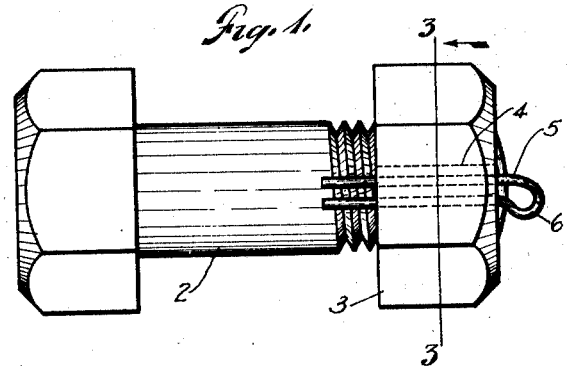
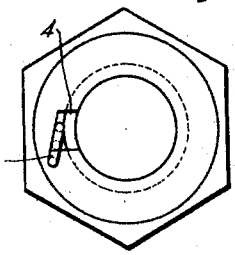
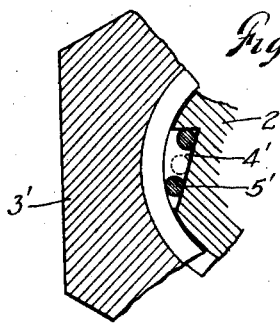
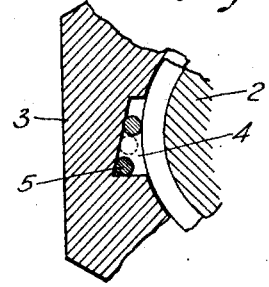
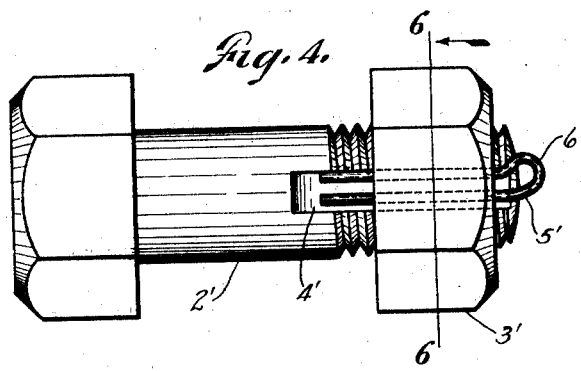
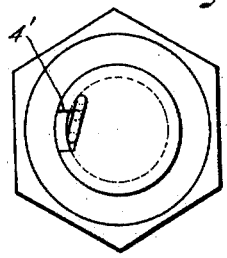
INVENTOR.
L. A. Shertzer
BY
ATTORNEY.

UNITED STATES PATENT OFFICE.

LEAVITT A. SHERTZER, OF MASSILLON, OHIO, ASSIGNOR OF ONE-HALF TO EDISON W. HART, OF MASSILLON, OHIO.

NUT-LOCK.

1,388,610.  Specification of Letters Patent.  Patented Aug. 23, 1921.

Application filed May 9, 1921. Serial No. 467,797.

*To all whom it may concern:*

Be it known that I, LEAVITT A. SHERTZER, a citizen of the United States, residing at Massillon, in the county of Stark and State of Ohio, have invented certain new and useful Improvements in Nut-Locks, of which the following is a specification.

This invention relates to nut-locks the object being to provide means of a simple and effective nature, which is capable of easy and ready application and which when in operative relation will positively prevent the nut from being accidentally turned off the bolt, but which when properly manipulated will permit the release of the nut and its ready separation from the bolt. The nut-lock is capable of general use such as a part of a rail-joint and in many mechanical fields.

In the drawing accompanying and forming part of the present specification, there are illustrated two of the many forms of embodiment of the invention which, to enable those skilled in the art to practice the same, will be set forth in the following description. The invention, however, is not limited to such disclosure. Various departures may be made therefrom within the scope of the invention defined by the claims following said description.

Referring to the said drawings:

Figure 1 is a side elevation of a nut-lock involving the invention.

Fig. 2 is an end view as seen from the right in Fig. 1.

Fig. 3 is a detail section of the forward portion of the nut-lock, the section being on the line 3—3 of Fig. 1.

Fig. 4 is a view corresponding to Fig. 1 of a modification.

Fig. 5 is a view as seen from the right in Fig. 4.

Fig. 6 is a view of the same kind as Fig. 3, but taken on the line 6—6 of Fig. 4.

Like characters refer to like parts throughout the several views, which are on different scales.

Mention has been made of the fact that there are several forms of embodiment of the invention; two of them will be hereinafter set forth. In all of these embodiments there is a bolt and a nut in threaded engagement therewith. One of these two parts has an aperture in which is located a forked resilient locker. The back of this aperture, which functions as a cam, is desirably tangential to the threaded surfaces so that when the nut is turned backwardly, one leg of the locker is cammed by this tangential or equivalent surface, into biting or solid engagement with a threaded surface to thus effectually prevent the nut being accidentally turned off, as by vibrations, jars, shocks and such conditions. The locker, however, when desired may be easily and quickly removed and the nut then taken off, by bringing the legs or branches of the locker toward each other, for example, by the use of a proper manually operated tool or by the fingers of the hand.

Referring first to Figs. 1, 2 and 3, the article therein shown, comprises a bolt as 2 and a nut as 3, the bolt having a threaded shank and a rigid head as customary with those of the ordinary kind.

As shown the nut has in it the aperture or slot 4. As illustrated the aperture or slot 4 extends entirely through the nut and although this is one preferred relation, it may not always be so, as will be hereinafter pointed out. The side walls of the slot or aperture as represented are straight and in parallelism with each other and are radial to the bolt. The outer wall of the slot or aperture, is also as shown flat and is virtually tangential to the circumference of the threaded surfaces of the bolt and the nut, so that it may function as a cam or wedge as will be hereinafter set forth.

Operatively associated with the bolt and its nut or more properly interposed therebetween, is an automatic locker, and a forked resilient pin functions satisfactorily in this regard and one somewhat after the fashion of a cotter pin meets the requirements. For this purpose the pin 5 answers, its head or closed end-portion 6 being laterally offset or bent. As will be clear the springiness of the pin naturally or inherently causes the legs or branches thereof to spread or separate to cause one leg of the pin to engage an adjacent side wall of the aperture, as shown in Fig. 3.

When the nut 3 is in assembled relation with the bolt and when the locker 5 is in active relation, the free end portion of the locker will be extended beyond the back face of the nut as shown for instance in Fig. 1, the head 6 of the locker projecting beyond the front face of the nut and the legs or branches of the locker being solidly against the outer or tangential surface of the aperture or slot 4 so that while the nut can be easily turned toward the right, if the threads of the bolt and nut be right ones, backward motion of the nut will be precluded because the outer flat wall of the aperture or slot functions as a cam or wedge and will press positively the inner or free leg or branch of the locker or cotter pin into the threaded surface of the bolt and with certainty eliminate accidental backward motion or turning off of the nut which can be accomplished only by pressing the legs or branches of the locker toward each other as shown by dotted lines in Fig. 3, when the pin can be pulled from place.

In Figs. 4, 5 and 6 is shown one of the many modifications. In these views the bolt is designated by 2' and the nut by 3'. The aperture or slot instead of being in the nut, is in the bolt, being denoted by 4' and as shown cutting the threaded surface of the bolt throughout its complete length. A side wall of this aperture, or slot 4', is straight and radial to the bolt, the bottom of the aperture being tangential to the threaded surfaces of the nut and the bolt. This slot 4' receives within it a locker 5' constructed exactly like the locker 5 and having the cranked head 6' at its forward end. The locker 5' when in active relation, is situated in the slot or aperture 5' and when there is any tendency of the nut 3' to back off the rear straight face of the aperture or slot 4' cams the adjacent leg of the locker into biting engagement with the inner threaded surface of the nut and thus prevents the same from being accidentally turned off the bolt. The nut may be released by the manual approach of the two legs of the locker 5', as shown by dotted lines in Fig. 6, which permits the leg or locker being pulled from place.

What I claim is:

1. The combination of a bolt and a nut thereon, one of said parts having an aperture, and a forked resilient locker in the aperture, the aperture having means to cam the locker into biting engagement with a threaded surface on backward movement of the nut.

2. The combination of a bolt and a nut thereon, one of said parts having an aperture, the back wall of which is tangential to the threaded surface of the bolt and the nut, and a forked resilient locker in the aperture, the back wall of which acts to cam one of the branches of the locker into biting engagement with a threaded surface on backward motion of the nut.

3. The combination of a bolt and a nut thereon, one of said parts having an aperture, a side wall of which is radial to the bolt, and the back surface of which is flat and tangential to the threaded surface, and a forked, resilient locker in said aperture, one of the legs of which engages said side wall, the back of the aperture acting to cam the other leg of the locker into biting engagement with a threaded surface on backward movement of the nut.

In testimony whereof I affix my signature.

LEAVITT A. SHERTZER.

Witnesses:
JULIA McCARTHY,
PERRY A. KUHN.